US007280045B2

(12) United States Patent
Saarisalo et al.

(10) Patent No.: US 7,280,045 B2
(45) Date of Patent: Oct. 9, 2007

(54) MACHINE-READABLE TAG, SELECTABLE EXTENSION ANTENNAS FOR USE THEREWITH, AND DISPLAY STRUCTURE HAVING SUCH TAG

(75) Inventors: Mikko Saarisalo, Kantvik (FI); Pekka K. Viitaniemi, Espoo (FI)

(73) Assignee: Nokia Corporation, Espoo (FI)

( * ) Notice: Subject to any disclaimer, the term of this patent is extended or adjusted under 35 U.S.C. 154(b) by 219 days.

(21) Appl. No.: 11/151,310

(22) Filed: Jun. 14, 2005

(65) Prior Publication Data
US 2007/0008139 A1   Jan. 11, 2007

(51) Int. Cl.
G08B 13/14 (2006.01)
(52) U.S. Cl. .................. 340/572.7; 340/10.1; 340/505; 343/742; 343/879
(58) Field of Classification Search ............. 340/572.7, 340/572.1, 505, 539.11, 10.1; 235/375; 455/25; 343/741, 742, 866, 867, 878, 879
See application file for complete search history.

(56) References Cited

U.S. PATENT DOCUMENTS

| 6,236,315 | B1 | 5/2001 | Helms et al. ............ 340/572.7 |
| 6,259,369 | B1 | 7/2001 | Monico ................... 340/572.8 |
| 6,839,035 | B1 * | 1/2005 | Addonisio et al. ......... 343/742 |
| 7,005,968 | B1 * | 2/2006 | Bridgelall ................ 340/572.1 |
| 2004/0046663 | A1 | 3/2004 | Jesser ...................... 340/572.1 |
| 2005/0086264 | A1 * | 4/2005 | Masuda ................... 707/104.1 |
| 2005/0178832 | A1 * | 8/2005 | Higuchi ..................... 235/440 |

FOREIGN PATENT DOCUMENTS

JP        2002162918 A * 6/2002

OTHER PUBLICATIONS

Klaus Finkenzeller, "RFID Handbook, Radio-Frequency Identification Fundamentals and Applications"; pp. 35-36; 103-104, John Wiley & Sons Ltd., ISBN 0-471-98851-0 (1999).

* cited by examiner

Primary Examiner—Thomas Mullen
(74) Attorney, Agent, or Firm—Morgan & Finnegan, L.L.P.

(57) ABSTRACT

An intelligent antenna system for extending the effective communication range of a machine-readable passive tag. The system includes intelligence that allows one of a plurality of extension antennas to be active at any given time in order to both facilitate communications and safeguard the system. The machine-readable tag and antenna system may be embedded in a structure. In a further embodiment, the system may include multiple passive tags that are active in correspondence to a display or advertisement currently being exhibited. The system includes means for operatively coupling a designated machine-readable tag to the embedded antenna network previously described.

44 Claims, 10 Drawing Sheets

MACHINE-READABLE TAG, SELECTABLE EXTENSION ANTENNAS FOR USE THEREWITH, AND DISPLAY STRUCTURE HAVING SUCH TAG

BACKGROUND OF INVENTION

1. Field of Invention

The present invention relates to wireless communications. More particularly, the invention is related to a system for improving the transmission of information via short-range communication through an improved multiple antenna arrangement for expanding the otherwise limited operational coverage area of a short-range communication source.

2. Description of Prior Art

A wireless communication device (WCD) may communicate over a multitude of networks. Cellular networks facilitate WCD communications over large geographic areas. For example, the Global System for Mobile Telecommunications (GSM) is a widely employed cellular network that communicates in the 900 MHZ-1.8 GHZ band in Europe and at 1.9 GHZ in the United States. This system provides a multitude of features including audio (voice), video and textual data communication. For example, the transmission of textual data may be achieved via the Short Messaging Service (SMS). SMS allows a WCD to transmit and receive text messages of up to 160 characters. It also provides data transfer to packet networks, ISDN and POTS users at 9.6 Kbps. While cellular networks like GSM provide a global means for transmitting and receiving data, due to cost, traffic and legislative concerns, a cellular network may not be appropriate for all data applications.

Bluetooth™ is a short-range wireless network technology quickly gaining acceptance in the marketplace. A Bluetooth™ enabled WCD may transmit and receive data at a rate of 720 Kbps within a range of 10 meters, and may transmit up to 100 meters with additional power boosting. A user does not manually instigate a Bluetooth™ wireless network. A plurality of devices within operating range of each other will automatically form a network group called a "piconet". Any device may promote itself to the master of the piconet, allowing it to control data exchanges with up to seven "active" slaves and 255 "parked" slaves. Active slaves exchange data based on the clock timing of the master. Parked slaves monitor a beacon signal in order to stay synchronized with the master, and wait for an active slot to become available. These devices continually switch between various active communication and power saving modes in order to transmit data to other members of the piconet.

More recently, manufacturers have began to incorporate various devices for providing enhanced functionality in a WCD (e.g., hardware components and software for performing close-proximity wireless information exchanges). Sensors and/or scanners may be used to read visual or electronic information into a device. A transaction may involve a user holding their WCD in proximity to a target, aiming their WCD at an object (e.g., to take a picture), sweeping the device over a tag or document, etc. Machine-readable technologies such as radio frequency identification (RFID), Infra-red (IR) communication, optical character recognition (OCR) and various other types of visual, electronic and magnetic scanning are used to quickly input desired information into the WCD without the need for manual entry by a user.

Short-range communication strategies are ideal for business entities seeking to reach information consumers in a designated geographic area. Short-range communications are mostly unregulated, and are generally a cost-effective solution for making data available to a potential recipient. For example, a business may set up a local access point to service customers that come within proximity of the access point. The Nokia Local Marketing Solution and iJack™ by TeliaSonera Finland Oyj are two examples of these local information delivery systems. These services use hardware access points communicating via Bluetooth™ to create piconets including accessible devices that come within transmission range. The service point becomes the master device, and may download price, coupon, show time, date, reservation information, etc. to a potential client. In another application, these systems may also be used to impart work-relevant data to employees or educational information to students, etc. While these systems may work automatically to impart desired information to a consumer, they are limited by the time required to both establish a network and download content. Often, an information consumer will not remain within range of an access point long enough to receive all of the information to be delivered by the device (e.g., a person strolling by a storefront), defeating the primary purpose of establishing the service point.

An alternative to downloading all of the desired information via short-range communication at the time of first contact would be to simply download a pointer, bookmark, indicator, link, etc. to the desired information. The downloaded pointer might include a website address (URL), email address, phone number, etc. that would in turn allow the device user to obtain the body of the desired information at a later time, for instance, from a dedicated short-range service point, via long-range data communication, via a wired internet connection, via a telephone, etc.

In at least one example of short-range machine-readable communication, RFID may be employed to convey several kilobytes worth of data to a scanning device in a relatively short amount of time. In addition, a passive RFID transponder or "tag" does not require its own power source. The tag receives power from the scanning device. Therefore, the passive tag may be imbedded in any manner of structure such as a poster, display, standee, doorway, wall, etc. A user passing near the tag may manually or automatically scan the tag and receive a response including desired information in a relatively short amount of time.

In at least the case of RFID communication, the already short effective communication range of the scanner/tag transponder (as short as 2-5 cm for a low power mobile device containing a scanner) may be further limited by the configuration or composition of the structure in which it is embedded. Certain materials may interfere with radio frequency waves, requiring a user to come closer to the tag in order to make contact. The resulting situation may create a "traffic jam" of users trying to get into the same area in order to receive the desired information. Therefore, what is needed is a way to extend the effective range of the machine-readable data so that a plurality of data users over an extended effective range may receive information from the same tag.

Various methods are known in the art for increasing the range of a machine-readable tag via extended antenna configurations. However, these configurations often involve a complex antenna structure hardwired to the tag intended to handle only one scanning device at a time. What is needed is a method including some intelligence for determining the source of a plurality of scanning signals and for adjusting the antenna system to account for these multiple scanners. The system must be able to select between active sources in order to return desired information back to a scanner while managing the loading of the antenna system.

SUMMARY OF INVENTION

The present invention includes an apparatus, method, program and system for extending the effective communication range of a machine-readable passive tag. The system includes intelligence that allows one of a plurality of extension antennas to be active at any given time in order to both facilitate communications and safeguard the system.

In at least one application of the invention, the machine-readable tag is embedded in a structure. The structure also includes embedded extension antennas increasing the effective range of the tag. Control logic also embedded in the structure senses a scanning device in proximity to an antenna (e.g., an active antenna), and configures the system to select the active antenna until a threshold limit is reached. The control logic may then activate another antenna or may reset the system to a monitoring mode.

In a further embodiment of the invention, the system may include multiple passive embedded tags that are active in correspondence to a certain informational display or advertisement currently being exhibited. The system includes means for operatively coupling the designated machine-readable tag to the embedded antenna system previously described.

DESCRIPTION OF DRAWINGS

The invention will be further understood from the following detailed description of a preferred embodiment, taken in conjunction with appended drawings, in which.

DESCRIPTION OF PREFERRED EMBODIMENT

While the invention has been described in preferred embodiments, various changes can be made therein without departing from the spirit and scope of the invention, as described in the appended claims.

The present invention may be employed in enhancing or extending the communication ability of a short-range machine-readable tag. While RFID tags will be discussed throughout the specification, the same system may be applied to any short-range machine-readable communication technology employing similar communication characteristics.

Figure 1:
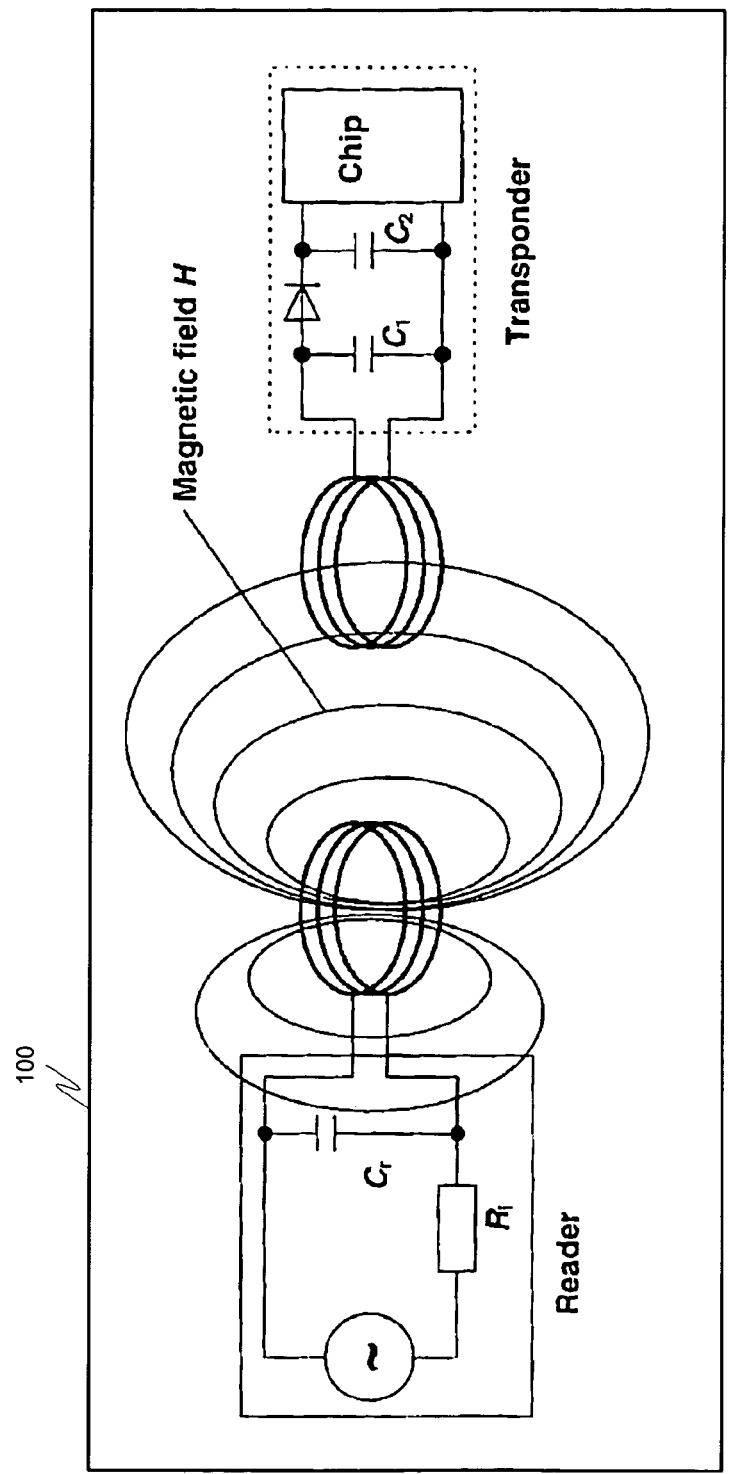
FIG. 1 is an exemplary diagram of a rudimentary RFID scanner and transponder.

FIG. 1 depicts a baseline RFID scanner/transponder system 100. The reader (scanner) includes a power source (~) which when combined with Cr and Ri induce a current in the connected wire loop or antenna. This current in the antenna in turn creates an electromagnetic field which emanates from the coil. The strength of the field depends on the power source, the size and number of turns in the coil, etc.

Some part of the electromagnetic field generated by the scanner penetrates the antenna of the transponder. The field inductively creates a current in the transponder antenna coil and this current is converted into a voltage used to power a microchip attached to the coil (chip). The chip may then switch on and off a load resistance in the transponder's antenna. This change in load resistance will manifest in voltage drops and subsequent gains in the scanner's antenna, which may be measured. This amplitude modulation effected upon the scanner antenna by the transponder may be controlled by data in the chip, which results in the transference of data in a process called load modulation. This of course describes the most basic functioning of an RFID system. The system may be altered in both makeup and behavior in order to achieve longer transmission distance.

Figure 2:
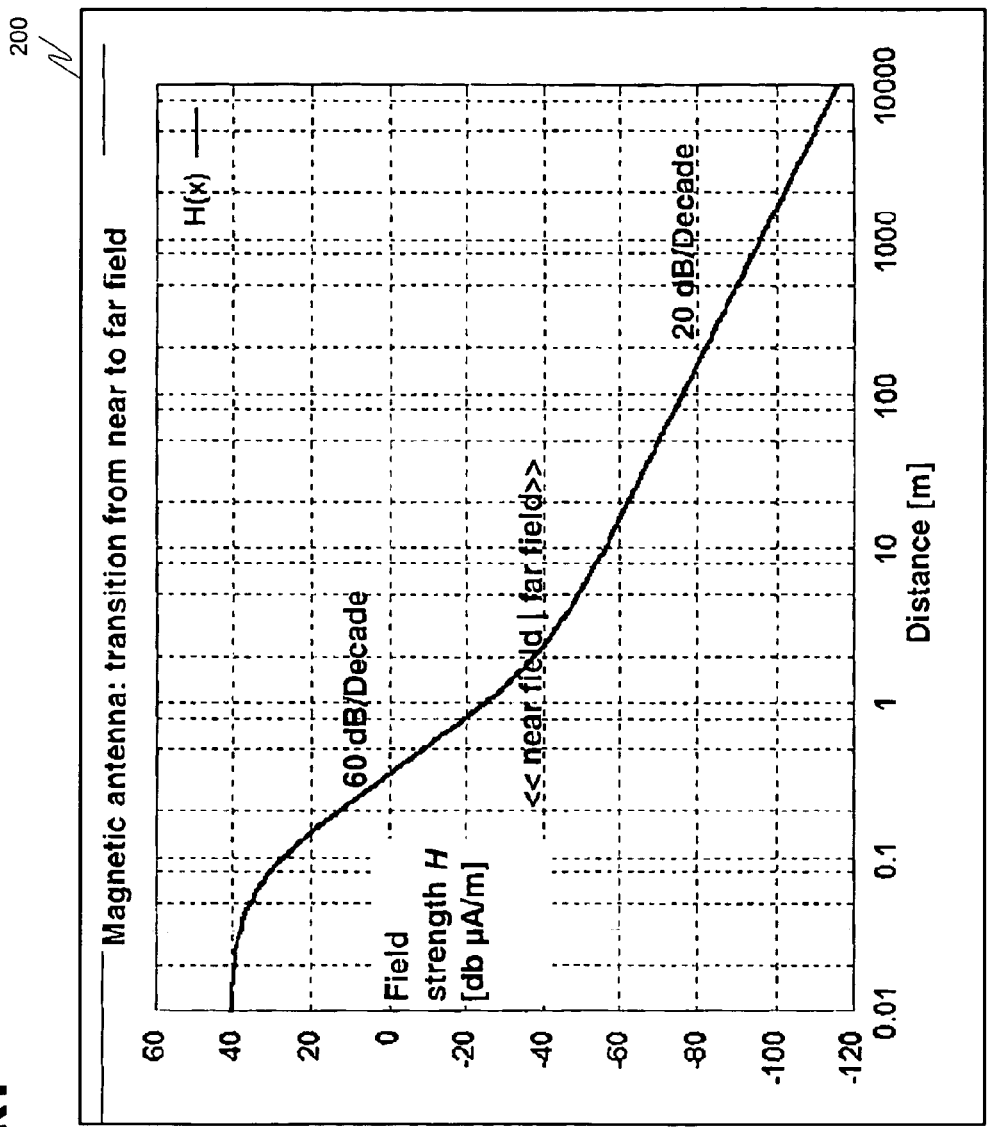
FIG. 2 is a chart demonstrating the field strength of a magnetic antenna system operating at 13.56 MHz over distance.

FIG. 2 includes a chart that demonstrates magnetic field strength at various distances at a frequency of 13.56 MHz. The electromagnetic coupling between a scanner and transponder must occur while the magnetic field is still connected to the scanner antenna. This condition is called "near field". Once the electromagnetic field emanates from the scanner antenna into space, the electromagnetic waves are considered to be "far field". In order to have an inductive connection, wherein the scanner powers the transducer and the transducer in turn communicates data by inducing voltage changes in the scanner antenna, the coils must have an inductive or capacitive coupling. This means that the system can only operate up to the near field maximum. Per FIG. 2, at this frequency the near field maximum is about 3.5 m. This means that the system has a maximum operation range of 3.5 m. It is important to note that RFID systems operating at a distance over 1 m are considered to be long range systems. 90-95% of all RFID equipment purchased is used in inductively coupled systems that typically operate at a maximum range of 1 m. However, even this distance may be substantially shortened because the induced power transmitted via inductive coupling can be very low relative to the scanner power and the size of the antennas. For example, a portable scanner running off of battery power, such as a compact scanner contained in a WCD, may only have an effective scanning range of 2-5 cm under normal conditions.

The short effective transmission range of communication technologies, such as previously described, limit possible applications. Low power scanners must be almost on top of a transponder to perform reliable communication, which would not be conducive to a commercial setting with a large number of targeted recipients. If, for example, an advertiser or business owner wants to transfer information to customers in proximity of a poster or billboard, the information must begin downloading as soon as possible given that the targeted scanning device may only pause momentarily in front of the structure containing the tag. One way to facilitate complete downloads is to start the download as soon as possible by extending the effective transmission range of the machine readable tag.

Figure 3:
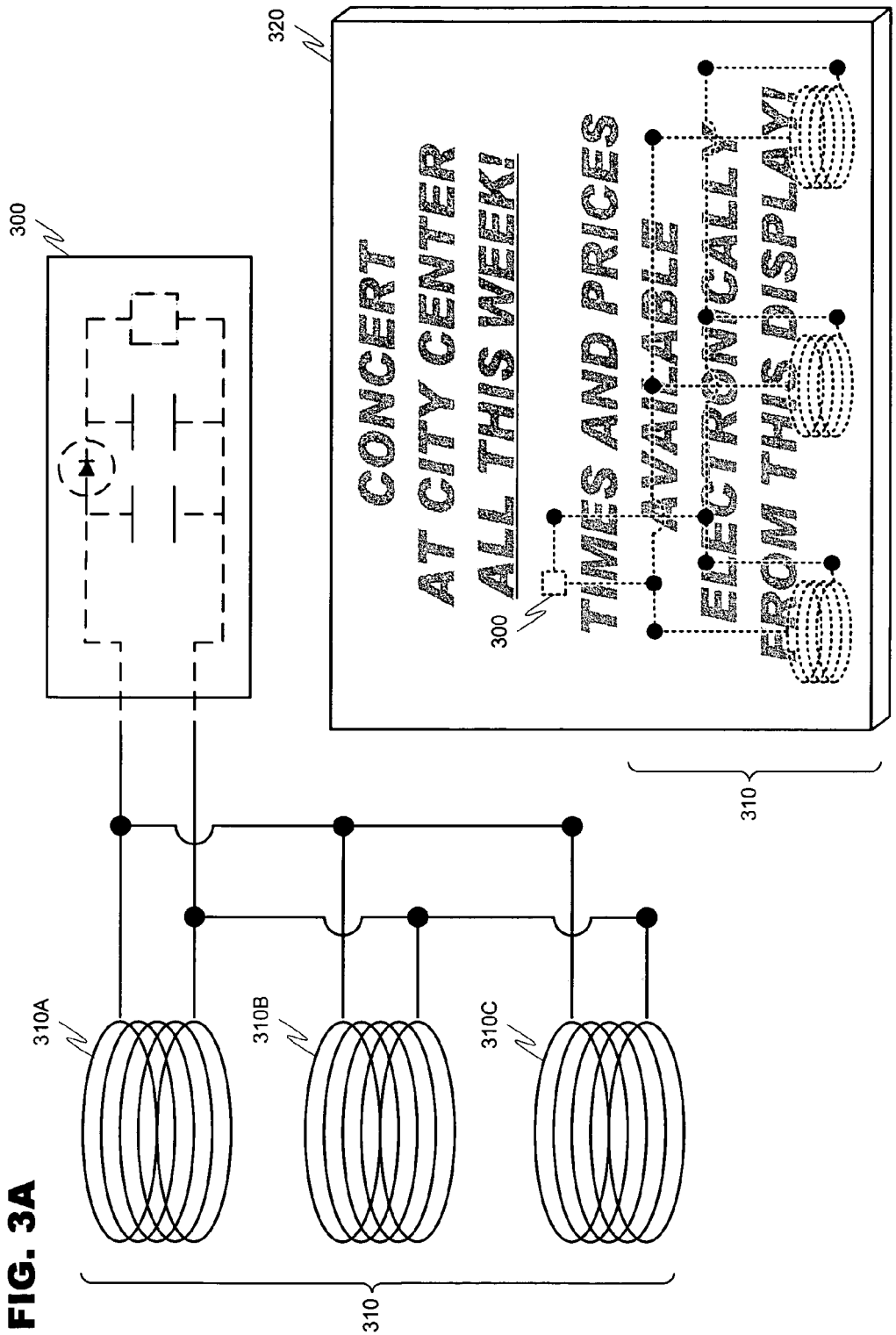
FIG. 3A is a circuit diagram of an exemplary extended antenna system for a machine-readable tag.
FIG. 3B is an exemplary application of the system of FIG. 3A.

FIG. 3A depicts the functional layout of a transponder system including an extended antenna. Extended antenna 310 includes three coils 310A-C. These coils are connected to transponder 300 which includes a rectifier and control chip. If an RFID scanner were to approach any of these coils, the transponder could form an inductive link and transfer data back to the scanner. However, as explained below, this system is not effective due to losses or potential overages from multiple simultaneous scanning.

FIG. 3B includes an application of the system of FIG. 3A. Here sign or billboard 320 includes a transponder tag 300 and an extended antenna 310. The extended antenna includes three antenna coils extending along the bottom of the sign. While this construct provides more RFID coverage along the length of the sign, it is not without it's drawbacks. A single scanner may not able to induce a strong enough current in a single coil to power the transponder due to the increased overall length of the antenna. On the other hand, the system does not account for multiple scanner devices concurrently in proximity of the plurality of coils. A risk exists for the transponder system to become overloaded if too many devices are scanning the various antennas simultaneously. There is also a physical limitation rendering the system inflexible. The extended antenna may be integrated into the display in which a poster or billboard is housed (e.g., the extended antenna coils may be a part of the frame of a display case). The changing of a poster or billboard, either manually or automatically, would require some sort of system to sever the physical linkage between the specific transponder pertaining to the poster and the extended antenna.

Figure 4:
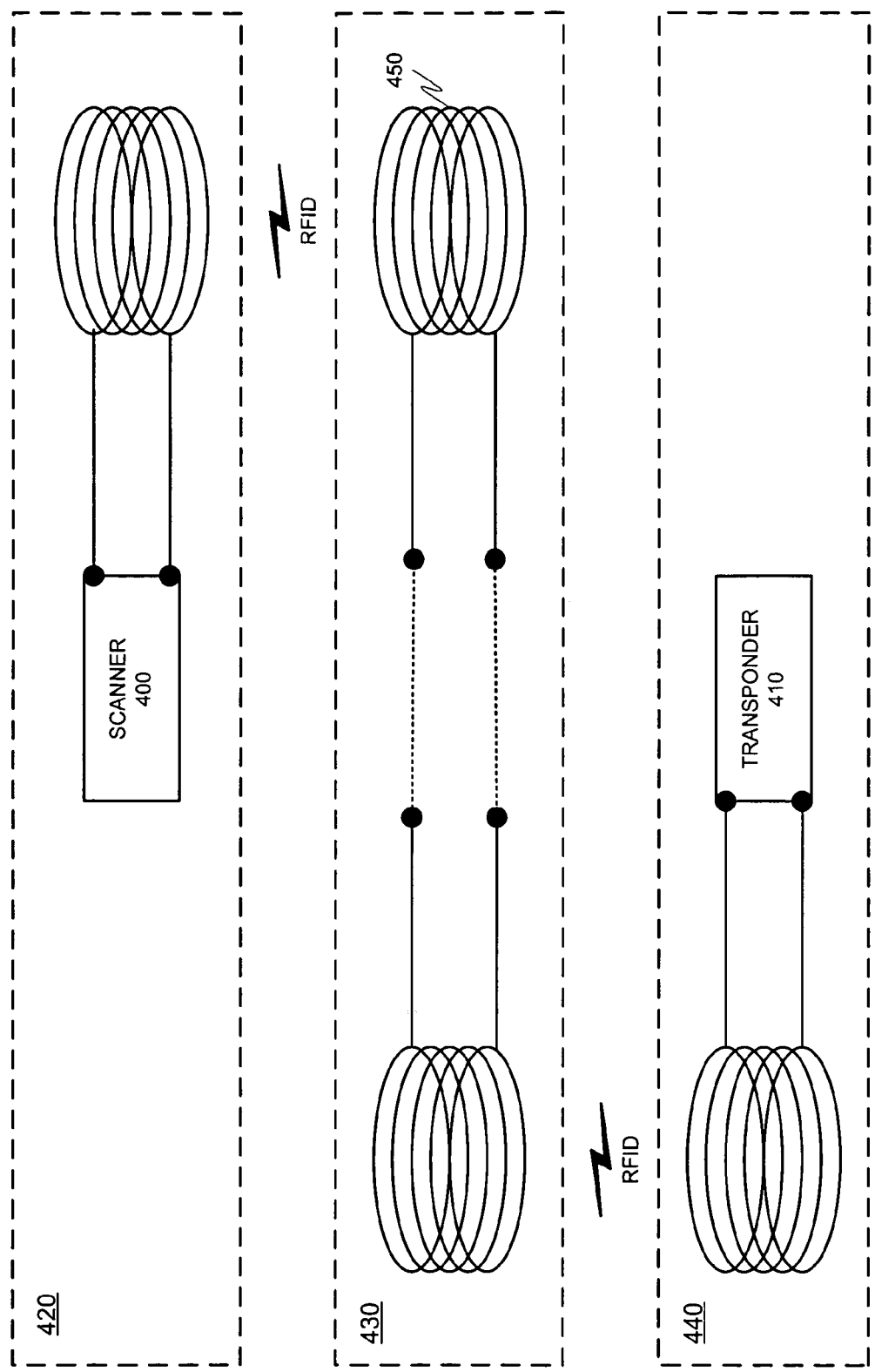
FIG. 4 is a diagram of an extended antenna system in accordance with at least one embodiment of the present invention.

FIG. 4 demonstrates a wireless method of coupling a scanning device outside a structure to a transponder inside a structure using a wireless extension antenna 450 in accordance with at least one embodiment of the present invention. Scanner 400 resides in region 420. Region 420 exists outside a structure (e.g., in proximity to a display box for a poster or billboard). Wireless extension antenna 450 resides within the structure itself (region 430). For instance, in the previous structural example the antenna might be built into the frame of a display case or may consist of a transparent conductive coating applied to the surface of the display glass, etc. The transponder 410 is found in region 440. This may be an area within the structure such as adhered to a poster, in a special receptacle or holder, etc. The extension antenna 450 bridges the space from region 420 to 440 by receiving an induced electromagnetic field at one end and summarily imparting the electromagnetic field at the opposite end so that a transponder coil may receive the energy. In this way, the reception of the transponder coil is extended without the need to mechanically connect the tag to the extension antenna.

Figure 5:
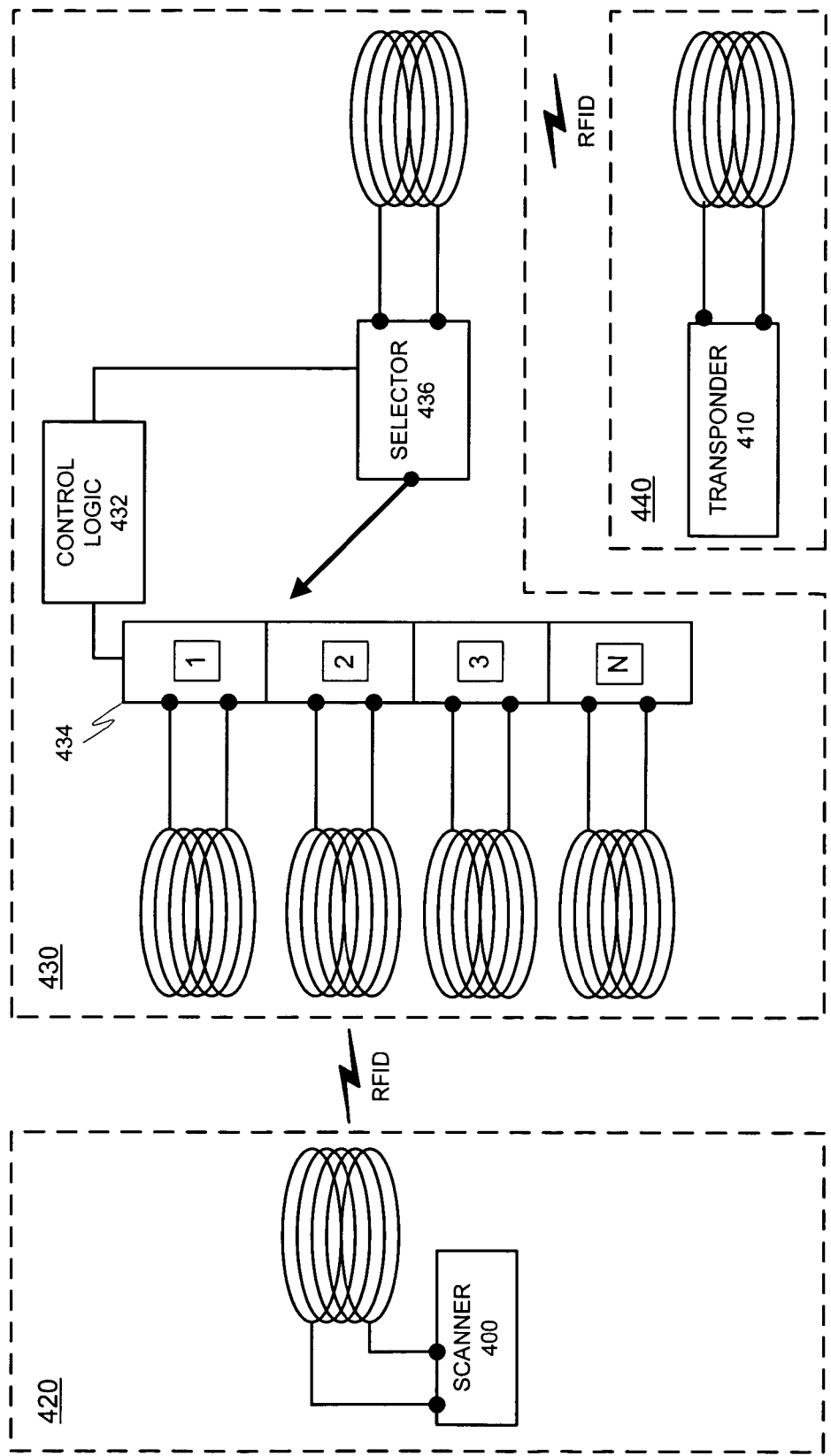
FIG. 5 is a functional diagram of an extended antennae system including control logic in accordance with at least one embodiment of the present invention.

FIG. 5 draws on the previously mentioned principles to yield another embodiment of the present invention. Here scanner 400 (region 420) and transponder 410 (region 440) are separated by region 430 containing an extension antenna system. However, in this case the extension antenna system is equipped with control logic employed to manage multiple extension antennas. Control logic 432 is a control device including both inputs and outputs. The logic may be composed of monolithic hardware components, programmable components, or a combination of memory and processing components acting to implement a program code. The control logic inputs are connected to field sensors 434 which may be integrated into each extension antenna, integrated into the control logic, stand alone sensors connected by a bus, etc. These sensors alert control logic 432 when an electromagnetic scanning field is in close proximity to a particular extension antenna. The control logic may be alerted to the presence of a magnetic field in proximity to an extension antenna by monitoring the excitation of each antenna (via the sensors) to determine whether a threshold level has been exceeded. The threshold level may be related to a field level, an induced voltage, an induced current, etc. An antenna in this state is considered an "active" extension antenna. Control logic 432 interprets this information and in turn controls selector 436 to select an active antenna. Selector 436 is connected to a coil which may couple a selected active extension antenna in section 430 to the transponder coil in section 440.

Figure 6:
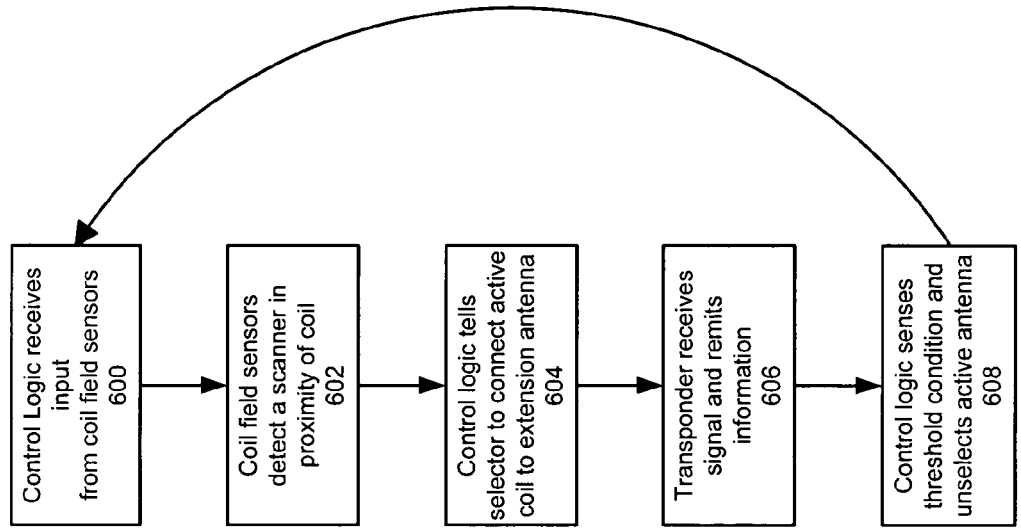
FIG. 6 is a flow chart diagramming a communication sequence in accordance with at least one embodiment of the present invention.

The process of at least one embodiment of the present invention is explained in FIG. 6. In step 600, control logic 432 receives input from antenna field sensors 434. These sensors advise the control logic 432 when an electromagnetic field, and hence a scanning device, is in proximity to a coil (step 602). The control logic 432 may use a variety of algorithms to determine which coil to activate (step 604). For example, if multiple coil sensors become active due to multiple scanning devices being in proximity of the system, the control logic 432 may queue the active antennas in order to dispatch the scanning devices in a certain order. Once an active extension antenna is selected, the scanning signal is relayed to a coupling antenna in step 606, which induces a voltage in the antenna for transponder tag 410. Information included on a microchip in the tag is then relayed back to the scanner via inductive coupling. The system may then disconnect the active extension antenna (step 608) and activate another extension antenna or resume scanning for additional active antennas based on a multitude of threshold conditions. These conditions may include a signal from the transponder, the lack of an electromagnetic field induced in the selected active antenna, the presence of an electromagnetic field at another extension antenna, duration, etc. At this point the system returns to step 600 where it waits for the presence of an electromagnetic field at one of the extension antennas.

Figure 7:
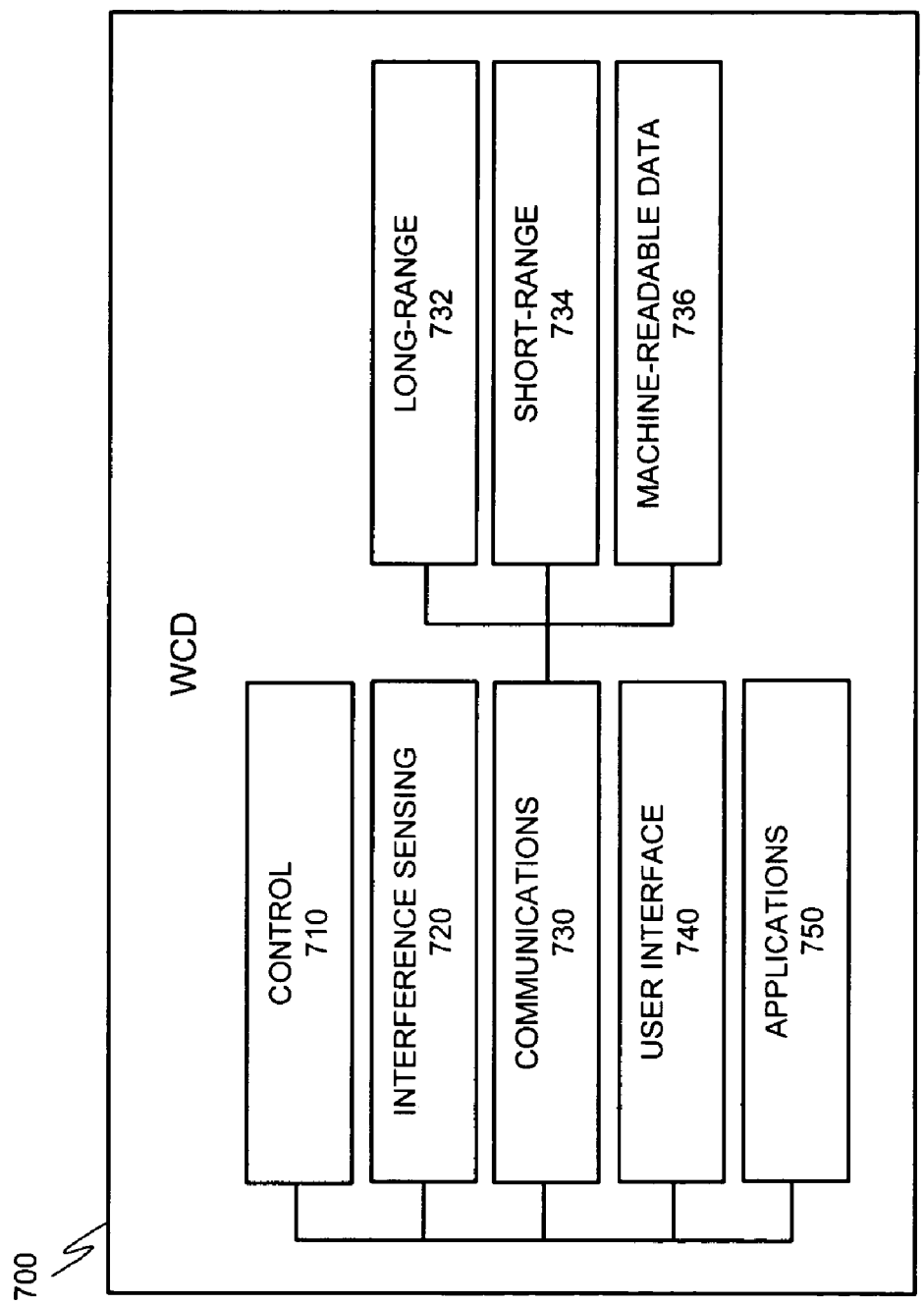
FIG. 7 in a modular diagram of an exemplary wireless communication device that may be employed with at least one embodiment of the present invention.

FIG. 7 discloses an exemplary modular layout for a wireless communication device usable with the instant invention. WCD 700 is broken down into modules representing the functional aspects of the device. These functions may be performed by various combinations of software and/or hardware components discussed below.

Control module 710 regulates the operation of the device. Inputs may be received from various other modules included within WCD 700. For example, interference sensing module 720 may use various techniques known in the art to sense sources of environmental interference within the effective transmission range of the wireless communication device. Control module 710 interprets these data inputs and in response may issue control commands to the other modules in WCD 700.

Communications module 730 incorporates all of the communications aspects of WCD 700. As shown in FIG. 7, communications module 730 includes for example long-range communications module 732, short-range communications module 734 and machine-readable data module 736.

Communications module 730 utilizes at least these submodules to receive a multitude of different types of communication from both local and long distance sources, and to transmit data to recipient devices within the broadcast range of WCD 700. Communications module 730 may be triggered by control module 710 or by control resources local to the module responding to sensed messages, environmental influences and/or other devices in proximity to WCD 700.

User interface module 740 includes visual, audible and tactile elements which allow the user of WCD 100 to receive data from, and enter data into, the device. The data entered by the user may be interpreted by control module 710 to affect the behavior of WCD 700. User inputted data may also be transmitted by communications module 730 to other devices within effective transmission range. Other devices in transmission range may also send information to WCD 700 via communications module 730, and control module 710 may cause this information to be transferred to user interface module 740 for presentment to the user.

Applications module 750 incorporates all other hardware and/or software applications on WCD 700. These applications may include sensors, interfaces, utilities, interpreters, data applications, etc., and may be invoked by control module 710 to read information provided by the various modules and in turn supply information to requesting modules in WCD 700.

Figure 8:
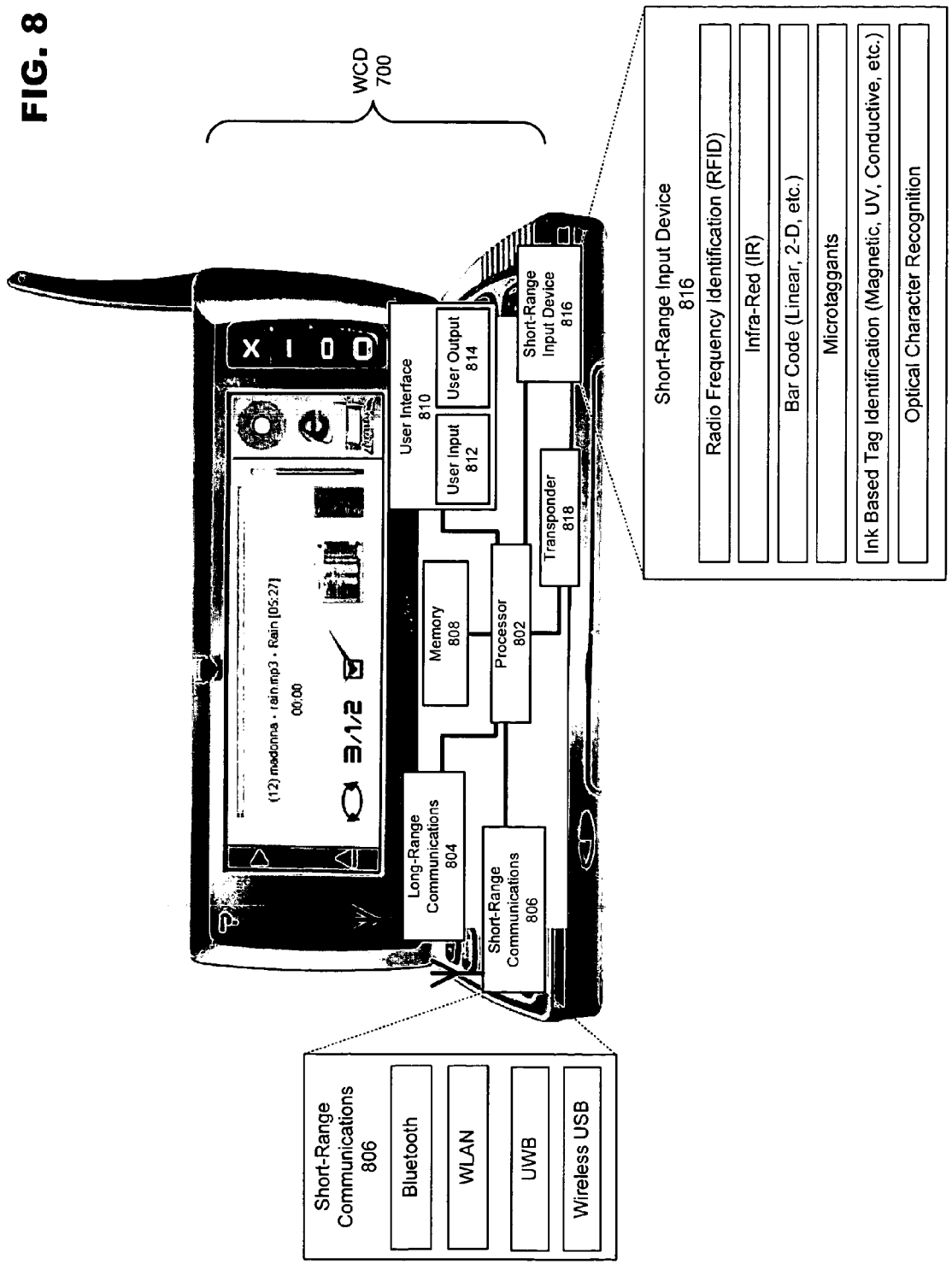
FIG. 8 is a functional diagram of an exemplary wireless communication device that may be employed with at least one embodiment of the present invention.

FIG. 8 discloses an exemplary structural layout of WCD 700 according to an embodiment of the present invention that may be used to implement the functionality of the modular system previously described. Processor 802 controls overall device operation. As shown in FIG. 8, processor 802 is coupled to communications sections 804, 806 and 816. Processor 802 may be implemented with one or more microprocessors that are each capable of executing software instructions stored in memory 808.

Memory 808 may include random access memory (RAM), read only memory (ROM), and/or flash memory, and stores information in the form of data and software components (also referred to herein as modules). The data stored by memory 808 may be associated with particular software components. In addition, this data may be associated with databases, such as a bookmark database or a business database for scheduling, email, etc.

The software components stored by memory 808 include instructions that can be executed by processor 802. Various types of software components may be stored in memory 808. For instance, memory 808 may store software components that control the operation of communication sections 804, 806 and 816. Memory 808 may also store software components including a firewall, a service guide manager, a bookmark database, user interface manager, and any communications utilities modules required to support WCD 700.

Long-range communications 804 performs functions related to the exchange of information across large coverage area networks (such as cellular networks) via an antenna. Therefore, long-range communications 804 may operate to establish data communications sessions, such as General Packet Radio Service (GPRS) sessions and/or Universal Mobile Telecommunications System (UMTS) sessions. Also, long-range communications 804 may operate to transmit and receive messages, such as short messaging service (SMS) messages and/or multimedia messaging service (MMS) messages.

Short-range communications 806 is responsible for functions involving the exchange of information across short-range wireless networks. As described above and depicted in FIG. 8, examples of such short-range communications 806 are not limited to Bluetooth™, WLAN, UWB and Wireless USB connections. Accordingly, short-range communications 806 performs functions related to the establishment of short-range connections, as well as processing related to the transmission and reception of information via such connections.

Short-range input device 816, also depicted in FIG. 8, may provide functionality related to the short-range scanning of machine-readable data. For example, processor 802 may control short-range input device 816 to generate RF signals for activating an RFID transponder, and may in turn control the reception of signals from an RFID transponder. Other short-range scanning methods for reading machine-readable data that may be supported by the short-range input device 816 are not limited to IR communications, linear and 2-D bar code readers (including processes related to interpreting UPC labels), and optical character recognition devices for reading magnetic, UV, conductive or other types of coded data that may be provided in a tag using suitable ink. In order for the short-range input device 816 to scan the aforementioned types of machine-readable data, the input device may include optical detectors, magnetic detectors, CCDs or other sensors known in the art for interpreting machine-readable information.

Further shown in FIG. 8, user interface 810 is also coupled to processor 802. User interface 810 facilitates the exchange of information with a user. FIG. 8 shows that user interface 810 includes a user input 812 and a user output 814. User input 810 may include one or more components that allow a user to input information. Examples of such components include keypads, touch screens, and microphones. User output 814 allows a user to receive information from the device. Thus, user output portion 814 may include various components, such as a display, Light emitting diodes (LED), tactile emitters and one or more audio speakers. Exemplary displays include liquid crystal displays (LCDs), and other video displays.

WCD 700 may also include a transponder 818. This is essentially a passive device which may be programmed by processor 802 with information to be delivered in response to a scan from an outside source. For example, an RFID scanner mounted in a entryway may continuously emit radio frequency waves. When a person with a device containing transponder 818 walks through the door, the transponder is energized and may respond with information identifying the device.

Hardware corresponding to communications sections 804, 806 and 816 provide for the transmission and reception of signals. Accordingly, these portions may include components (e.g., electronics) that perform functions, such as modulation, demodulation, amplification, and filtering. These portions may be locally controlled, or controlled by processor 802 in accordance with software communications components stored in memory 808.

The elements shown in FIG. 8 may be constituted and coupled according to various techniques in order to produce the functionality described in FIG. 7. One such technique involves coupling separate hardware components corresponding to processor 802, communications sections 804 and 806, memory 808, short-range input device 816, user interface 810, etc. through one or more bus interfaces. Alternatively, any and/or all of the individual components may be replaced by an integrated circuit in the form of a programmable logic device, gate array, ASIC, multi-chip module, etc. programmed to replicate the functions of the stand-alone devices. In addition, each of these components is coupled to a power source, such as a removable and/or rechargeable battery (not shown).

The user interface 810 may interact with a communications utilities software component, also contained in memory 808, which provides for the establishment of service sessions using long-range communications 804 and/or short-range communications 806. The communications utilities component may include various routines that allow the reception of services from remote devices according to mediums, such as the Wireless Application Medium (WAP).

When engaging in WAP communications with a remote server, the device functions as a WAP client. To provide this functionality, the software components may include WAP client software components, such as a Wireless Markup Language (WML) Browser, a WMLScript engine, a Push Subsystem, and a Wireless Medium Stack.

Applications (not shown) may interact with the WAP client software to provide a variety of communications services. Examples of such communications services include the reception of Internet-based content, such as headline news, exchange rates, sports results, stock quotes, weather forecasts, multilingual phrase dictionaries, shopping and dining information, local transit (e.g., bus, train, and/or subway) schedules, personal online calendars, and online travel and banking services.

The WAP-enabled device may access small files called decks which each include smaller pages called cards. Cards are small enough to fit into a small display area that is referred to herein as a microbrowser. The small size of the microbrowser and the small file sizes are suitable for accommodating low memory devices and low-bandwidth communications constraints imposed by wireless links.

Cards are written in the Wireless Markup Language (WML), which is specifically devised for small screens and one-hand navigation without a keyboard. WML is scaleable so that it is compatible with a wide range of displays that covers two-line text displays, as well as large LCD screens found on devices, such as smart phones, PDAs, and personal communicators. WML cards may include programs written in WMLScript, which is similar to JavaScript. However, through the elimination of several unnecessary functions found in these other scripting languages, WMLScript reduces memory and processing demands.

Figure 9:
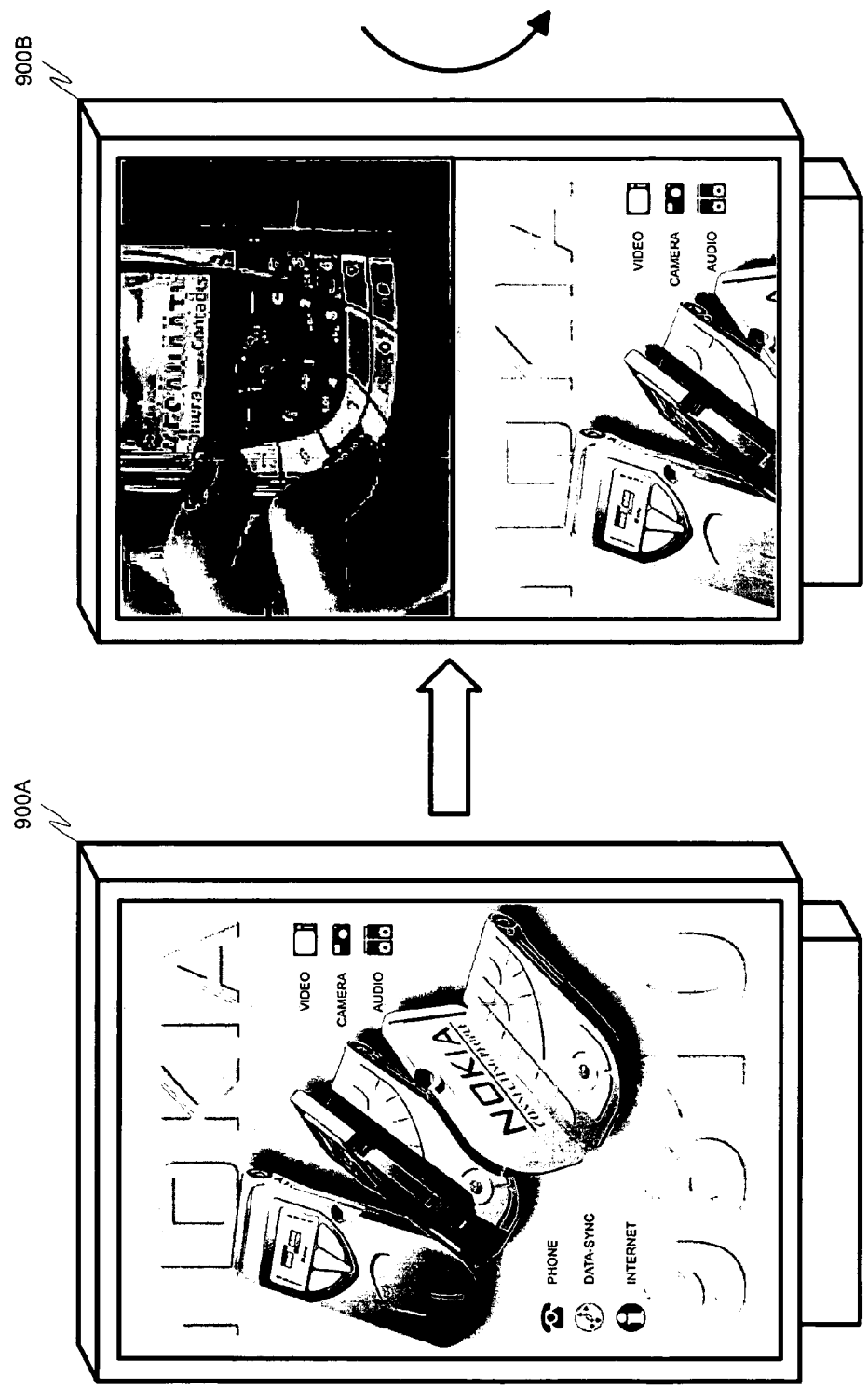
FIG. 9 is an exemplary scrolling sign or billboard that may be employed with at least one embodiment of present invention.

FIG. 9 discloses a display device usable in at least one embodiment of the instant invention. A scrolling sign or billboard device is disclosed at 900A. The device includes a display box with a transparent front for displaying signs or posters containing an indicia of an informative nature (e.g., commercial, educational, instructional, etc.) In an improvement over traditional display devices, a plurality of posters may be included on a roller mechanism inside the display box. The device may then include control logic to periodically change from one poster to another, maximizing the use of the display box for different advertisers. The scrolling sign or billboard is shown at 900B during a change from one poster to another.

Figure 10:
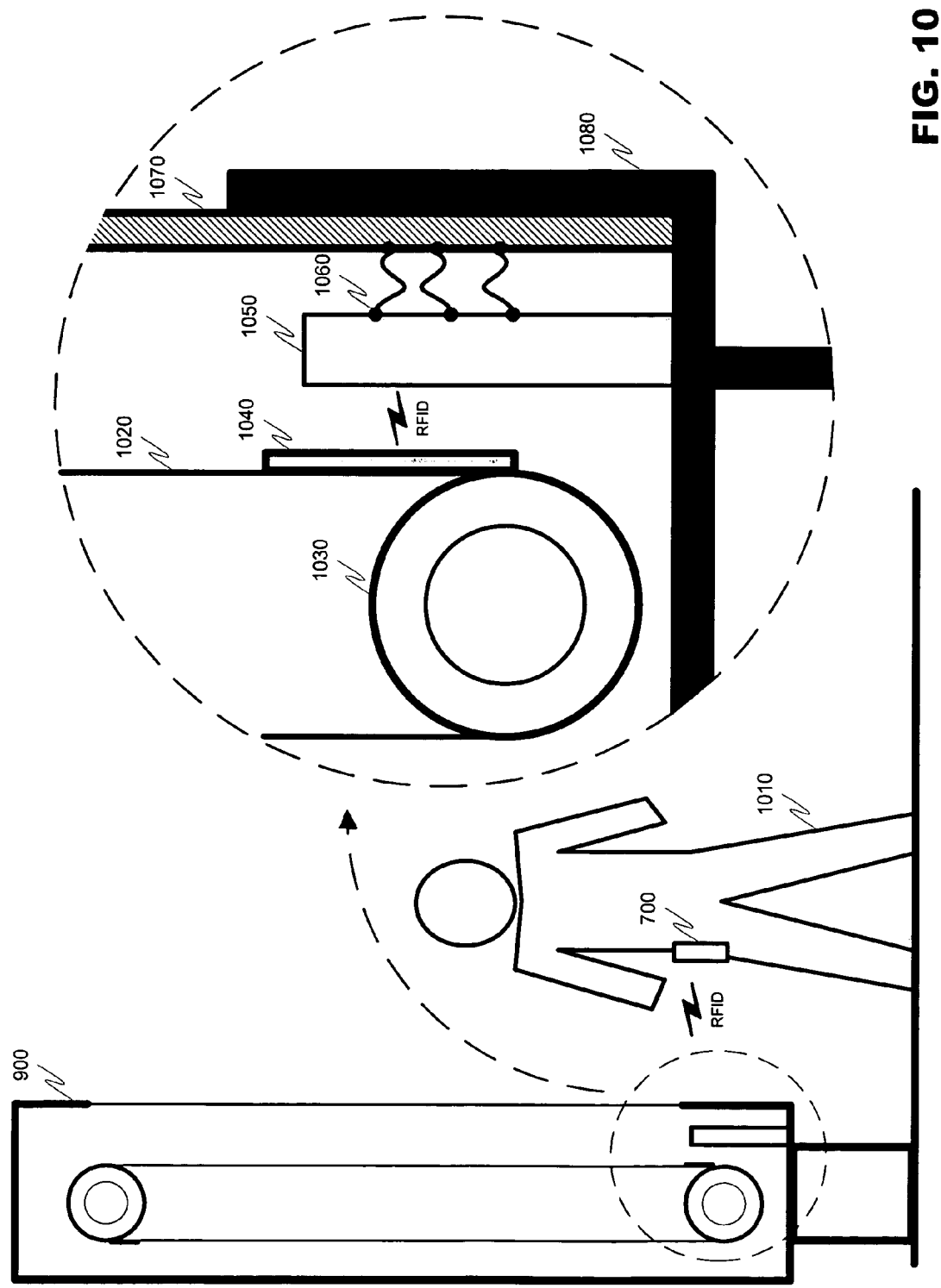
FIG. 10 includes a close-up section of the sign of FIG. 8 demonstrating the application of at least one embodiment of the present invention.

A close-up of at least one implementation of the WCD 700 disclosed in FIG. 7-8 interacting with the scrolling sign or billboard of FIG. 9 is now disclosed in FIG. 10. Sign 900 is shown from a side view as a user 1010 passes in front of it bearing WCD 700. In at least one embodiment of the invention, the system embedded in sign 900 allows information to be transferred to the WCD 700 automatically through RFID communication. This embodiment of the invention is shown in detail inside of the dotted circle also in this figure. Posters 1020 are contained on roller system 1030. After some threshold is reached (e.g. periodic, sensed motion, etc.) the control system of sign 900 moves the rollers to display another poster contained in the sign. The number of posters contained in a sign 900 may vary depending on the mechanism of the particular sign. Each poster 1020 may contain a machine-readable tag 1040 adhered to the surface of the poster. In the embodiment shown in FIG. 10, the tag is an RFID tag. Tag 1040 is located proximate to antenna controller 1050 when a poster is being displayed in sign 900. Antenna controller 1050 may include the previously discussed control logic 432, field sensors 434, selector 436 and a coil for inductively coupling to the tag 1040. The antenna controller 1050 is connected to various extension antennas embedded in sign 900 through conductors 1060. These conductors may be wires, traces, buses, etc. which connect the antenna controller 1050 to various antenna coils embedded in transparent material 1070 or housing 1080.

The system of FIG. 10 provides a flexible solution for delivering desired data to information consumers. When sign 900 moves a new poster into place for display, the tag 1040 is moved proximate to antenna controller 1050. A user 1010 then may come into range of sign 900 to observe the poster 1020. The poster 1020 may indicate that electronic information is available, but indication is not required. In at least one embodiment, the user may then hold their WCD 700 up to the sign and activate a scan function pertaining to the machine-readable data. Alternatively, WCD 700 may continuously scan for machine-readable data and may also include a filter or firewall to automatically exclude certain types of information. In the case of RFID, electromagnetic waves contact an antenna embedded in transparent material 1070 or housing 1080 of the sign 900. Antenna controller 1050 includes control logic 432 which reacts to an indication from a field sensor 434 and sets the selector 436 to select the active antenna. The antenna coil contained in antenna controller 1050 then inductively couples to the tag 1040 which energizes a chip contained within the tag (not pictured). The chip may then impart information contained on the chip back through the antenna system to the scanning device in WCD 700. The information may contain a website address (URL), an email address, a SMS or MMS address, a telephone number, etc. allowing the user to get more information on the desired subject at a later time. Antenna controller 1050, when some threshold is attained, may then deactivate the currently active antenna and activate another antenna, or reset the system in order to prepare for the next sensed scanning device.

The present invention is an improvement over the prior art because the extension antenna system facilitates faster and more reliable communication for short-range machine-readable data. In at least the case of RFID communication, energy and information is reliably conveyed through an intelligent system of extension antennas. The intelligent antenna controller of the present invention also provides for a flexible system wherein multiple machine-readable tags may be used to impart different information to a user depending on the specific poster or sign on display. In this way, in at least one embodiment of the invention, the system improves the delivery of desired data to an information consumer.

Accordingly, it will be apparent to persons skilled in the relevant art that various changes in form and detail can be made therein without departing from the spirit and scope of the invention. This the breadth and scope of the present invention should not be limited by any of the above-described exemplary embodiments, but should be defined only in accordance with the following claims and their equivalents.

What is claimed is:

1. An apparatus for controlling a plurality of short-range antennas comprising:
   an antenna selector for selecting from a plurality of antennas at least one antenna to be operatively coupled to a machine-readable tag; and
   antenna logic operatively coupled with the antenna selector for controlling said antenna selector;
   wherein the antenna logic controls the antenna selector to select from the plurality of antennas the at least one antenna in response to detecting activation of said at least one antenna for receiving a short-range scanning signal from a remote source to convey to the machine-readable tag.

2. The apparatus of claim 1, wherein the plurality of antennas are usable in Radio Frequency Identification (RFID) communication.

3. The apparatus of claim 1, wherein the plurality of antennas not selected are decoupled from the machine readable tag.

4. The apparatus of claim 1, wherein the plurality of antennas, the antenna selector and the antenna controller are included in a structure.

5. The apparatus of claim 4, wherein the structure is a display structure for displaying a sign containing indicia of an informative nature.

6. The apparatus of claim 5, wherein the machine-readable tag is affixed to the sign.

7. The apparatus of claim 5, wherein the display structure is capable of housing and automatically displaying multiple signs individually in succession.

8. The apparatus of claim 7, wherein a machine-readable tag is affixed to each sign.

9. The apparatus of claim 1, wherein an antenna is activated when the antenna logic determines a short-range scanning signal is in close proximity to the antenna by measuring a threshold condition related to the antenna.

10. The apparatus of claim 1, wherein the apparatus further comprises one or more sensing devices operatively coupled with the antenna logic for informing which antennas are activated antennas.

11. The apparatus of claim 1, wherein the antenna selector and antenna logic are contained in the same device.

12. The apparatus of claim 1, wherein the machine-readable tag passes information back to the remote source via the active antenna.

13. The apparatus of claim 1, wherein the antenna logic unselects the active antenna when a threshold condition has been attained.

14. A method for controlling a plurality of short-range antennas comprising:
   controlling an antenna selector using antenna logic to select at least one antenna from a plurality of antennas to be operatively coupled to a machine-readable tag;
   wherein the antenna logic controls the antenna selector to select from the plurality of antennas the at least one antenna in response to detecting activation of said at least one antenna for receiving a short-range scanning signal from a remote source to convey to the machine-readable tag.

15. The method of claim 14, wherein the plurality of antennas are usable in Radio Frequency Identification (RFID) communication.

16. The method of claim 14, wherein the plurality of antennas not selected are decoupled from the machine readable tag.

17. The method of claim 14, wherein the plurality of antennas, the antenna selector and the antenna controller are included in a structure.

18. The method of claim 17, wherein the structure is a display structure for displaying a sign containing indicia of an informative nature.

19. The method of claim 18, wherein the machine-readable tag is affixed to the sign.

20. The method of claim 18, wherein the display structure is capable of housing and automatically displaying multiple signs individually in succession.

21. The method of claim 20, wherein a machine-readable tag is affixed to each sign.

22. The method of claim 14, wherein an antenna is activated when the antenna logic determines a short-range scanning signal is in close proximity to the antenna by measuring a threshold condition related to the antenna.

23. The method of claim 14, wherein the apparatus further comprises one or more sensing devices operatively coupled with the antenna logic for informing which antennas are activated antennas.

24. The method of claim 14, wherein the antenna selector and antenna logic are contained in the same device.

25. The method of claim 14, wherein the machine-readable tag passes information back to the remote source via the active antenna.

26. The method of claim 14, wherein the antenna logic unselects the active antenna when a threshold condition has been attained.

27. A computer program product comprising a computer-readable medium having computer readable program code embodied in said medium for controlling a plurality of short-range antennas comprising:
   a computer readable program code for controlling an antenna selector using antenna logic to select at least one antenna from a plurality of antennas to be operatively coupled to a machine-readable tag;
   wherein the computer readable program code causes the antenna logic to control the antenna selector to select from the plurality of antennas the at least one antenna in response to detecting activation of said at least one antenna for receiving a short-range scanning signal from a remote source to convey to the machine-readable tag.

28. The computer program product of claim 27, wherein the plurality of antennas are usable in Radio Frequency Identification (RFID) communication.

29. The computer program product of claim 27, wherein the plurality of antennas not selected are decoupled from the machine readable tag.

30. The computer program product of claim 27, wherein the plurality of antennas, the antenna selector and the antenna controller are included in a structure.

31. The computer program product of claim 30, wherein the structure is a display structure for displaying a sign containing indicia of an informative nature.

32. The computer program product of claim 31, wherein the machine-readable tag is affixed to the sign.

33. The computer program product of claim 31, wherein the display structure is capable of housing and automatically displaying multiple signs individually in succession.

34. The computer program product of claim 33, wherein a machine-readable tag is affixed to each sign.

35. The computer program product of claim 27, wherein an antenna is activated when the antenna logic determines a short-range scanning signal is in close proximity to the antenna by measuring a threshold condition related to the antenna.

36. The computer program product of claim 27, wherein the apparatus further comprises one or more sensing devices operatively coupled with the antenna logic for informing which antennas are activated antennas.

37. The computer program product of claim 27, wherein the antenna selector and antenna logic are contained in the same device.

38. The computer program product of claim 27, wherein the machine-readable tag passes information back to the remote source via the active antenna.

39. The computer program product of claim 27, wherein the antenna logic disconnects the active antenna when a threshold condition has been attained.

40. A system for controlling a plurality of short-range antennas comprising:
   a display structure for displaying a plurality of signs containing an indicia of an informative nature individually in succession;
   a machine-readable tag affixed to each sign;
   an antenna selector for selecting at least one antenna from a plurality of antennas to be operatively coupled to the machine-readable tag affixed to the sign currently being displayed; and
   antenna logic operatively coupled with the antenna selector for controlling said antenna selector;
   wherein the antenna logic controls the antenna selector to select from the plurality of antennas the at least one antenna in response to detecting activation of said at least one antenna for receiving a short-range scanning signal from a remote source to convey to the machine-readable tag.

41. The system of claim 40, wherein the plurality of antennas are usable in Radio Frequency Identification (RFID) communication.

42. The system of claim 40, wherein the plurality of antennas not selected are decoupled from the machine readable tag.

43. The system of claim 40, wherein the apparatus further comprises one or more sensing devices operatively coupled with the antenna logic for informing which antennas are activated antennas.

44. The system of claim 40, wherein the machine-readable tag passes information back to the remote source via the active antenna.

* * * * *